US007243364B2

(12) United States Patent
Dunn et al.

(10) Patent No.: US 7,243,364 B2
(45) Date of Patent: Jul. 10, 2007

(54) INTERACTIVE ENTERTAINMENT NETWORK SYSTEM AND METHOD FOR CUSTOMIZING OPERATION THEREOF ACCORDING TO VIEWER PREFERENCES

(75) Inventors: Matthew W. Dunn, Seattle, WA (US); Daniel J. Shoff, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/388,691

(22) Filed: Mar. 14, 2003

(65) Prior Publication Data

US 2003/0154486 A1 Aug. 14, 2003

Related U.S. Application Data

(63) Continuation of application No. 09/179,545, filed on Oct. 26, 1998, now Pat. No. 6,571,390, which is a continuation of application No. 08/437,096, filed on May 5, 1995, now Pat. No. 5,861,906.

(51) Int. Cl.
  *H04N 7/173* (2006.01)
(52) U.S. Cl. .............................. 725/93; 725/86; 725/87; 725/88; 725/89; 725/90; 725/91; 725/98; 725/100; 725/101; 725/102; 725/104; 725/1; 725/5; 725/8; 725/29
(58) Field of Classification Search ................ 725/86, 725/87, 88, 90, 91, 93, 98, 100, 101, 102, 725/104, 1, 5, 8, 29; 709/217–219
See application file for complete search history.

(56) References Cited

U.S. PATENT DOCUMENTS

| 4,081,754 | A |   | 3/1978  | Jackson ............... 325/396 |
| 4,203,130 | A |   | 5/1980  | Doumit et al. ........... 358/1 |
| 4,228,543 | A |   | 10/1980 | Jackson ............. 358/191.1 |
| 4,439,784 | A | * | 3/1984  | Furukawa et al. ........ 725/25 |
| 4,506,387 | A | * | 3/1985  | Walter .................. 398/66 |
| 4,694,490 | A |   | 9/1987  | Harvey et al. .......... 380/20 |
| 4,704,725 | A |   | 11/1987 | Harvey et al. ........... 380/9 |
| 4,706,121 | A |   | 11/1987 | Young ................. 358/142 |
| 4,751,578 | A |   | 6/1988  | Relter et al. .......... 358/183 |
| 4,908,713 | A |   | 3/1990  | Levine ................ 358/335 |
| 4,947,244 | A |   | 8/1990  | Fenwick et al. ......... 358/86 |
| 4,977,455 | A |   | 12/1990 | Young .................. 358/84 |
| 5,038,211 | A |   | 8/1991  | Hallenbeck ........... 358/142 |
| 5,068,734 | A |   | 11/1991 | Beery ................ 358/191.1 |
| 5,133,079 | A |   | 7/1992  | Ballantyne et al. ..... 455/4.1 |
| 5,151,789 | A |   | 9/1992  | Young ............... 358/194.1 |
| 5,168,353 | A |   | 12/1992 | Walker et al. .......... 358/86 |

(Continued)

*Primary Examiner*—Jason Salce
(74) *Attorney, Agent, or Firm*—Lee & Hayes, PLLC

(57) ABSTRACT

An interactive entertainment network system has a video-on-demand (VOD) application which allows viewers to create their own customized lists of preferred video content programs, such as movies, games, TV shows, and so forth. Viewers are permitted to select criteria for grouping various video content programs into manageable sets. Lists of programs are provided in one or more scrollable lists, the scrolling rates of which are programmable. Once grouped, previews for the set of programs are displayed. The VOD application allows the viewers to browse the previews at their own rate, skipping forward to the next preview or backward to the previous preview. During this automated browsing, the VOD application enables the viewer to add any of the programs of interest to a customized list. The viewer can retrieve the customized list at any time. If the viewer orders a program from the customized list, the program remains available to the viewer for a rental period (which is adjustable). Upon expiration of the rental period, however, the program is no longer readily accessible until ordered again.

9 Claims, 12 Drawing Sheets

U.S. PATENT DOCUMENTS

| | | | | |
|---|---|---|---|---|
| 5,206,722 A | * | 4/1993 | Kwan | 725/100 |
| 5,233,654 A | | 8/1993 | Harvey et al. | |
| 5,270,561 A | | 12/1993 | Jun | 358/142 |
| 5,291,554 A | * | 3/1994 | Morales | 380/211 |
| 5,307,173 A | | 4/1994 | Yuen et al. | 358/335 |
| 5,335,079 A | | 8/1994 | Yuen et al. | 358/335 |
| 5,335,277 A | | 8/1994 | Harvey et al. | 380/20 |
| 5,353,121 A | | 10/1994 | Young et al. | 348/563 |
| 5,357,276 A | * | 10/1994 | Banker et al. | 725/102 |
| 5,400,402 A | * | 3/1995 | Garfinkle | 380/231 |
| 5,410,344 A | | 4/1995 | Graves et al. | 348/1 |
| 5,416,508 A | | 5/1995 | Sakuma et al. | 348/3 |
| 5,426,699 A | | 6/1995 | Wunderlich et al. | 380/20 |
| 5,446,490 A | | 8/1995 | Blahut et al. | 348/12 |
| 5,479,266 A | | 12/1995 | Young et al. | 358/335 |
| 5,479,268 A | | 12/1995 | Young et al. | 358/335 |
| 5,483,278 A | | 1/1996 | Strubbe et al. | 348/12 |
| 5,485,197 A | | 1/1996 | Hoarty | 348/7 |
| 5,508,732 A | | 4/1996 | Bottomley et al. | 348/7 |
| 5,524,195 A | | 6/1996 | Clanton, III et al. | 348/13 |
| 5,530,754 A | * | 6/1996 | Garfinkle | 725/8 |
| 5,539,449 A | | 7/1996 | Blahut et al. | 348/7 |
| 5,550,577 A | | 8/1996 | Verbies et al. | 348/7 |
| 5,555,441 A | * | 9/1996 | Haddad | 725/93 |
| 5,559,548 A | | 9/1996 | Davis et al. | 348/6 |
| 5,561,708 A | | 10/1996 | Remillard | 379/96 |
| 5,583,561 A | * | 12/1996 | Baker et al. | 725/93 |
| 5,592,551 A | * | 1/1997 | Lett et al. | 380/211 |
| 5,608,448 A | * | 3/1997 | Smoral et al. | 725/92 |
| 5,619,247 A | * | 4/1997 | Russo | 725/104 |
| 5,644,714 A | * | 7/1997 | Kikinis | 709/219 |
| 5,654,746 A | * | 8/1997 | McMullan et al. | 725/29 |
| 5,734,853 A | * | 3/1998 | Hendricks et al. | 345/716 |
| 5,896,454 A | * | 4/1999 | Cookson et al. | 360/60 |

* cited by examiner

Fig. 7

PROGRAM TABLE (110)

| ID | TITLE | MONIKER |
|---|---|---|
| 501 | TITLE 1 | TITLE1.MOD |
| 502 | TITLE 2 | TITLE2.MOD |
| 503 | TITLE 3 | TITLE3.MOD |

PROGRAM/TRAILER JOIN TABLE (118)

| PROGRAM ID | TRAILER ID |
|---|---|
| 501 | 901 |
| 502 | 902 |
| 503 | 903 |

TRAILER TABLE (116)

| ID | TITLE | MONIKER |
|---|---|---|
| 901 | TRAILER 1 | TRAILER1.MOD |
| 902 | TRAILER 2 | TRAILER2.MOD |
| 903 | TRAILER 3 | TRAILER3.MOD |

| TITLE | LENGTH | PROGRAM ID | PROGRAM MONIKER | TRAILER ID | TRAILER MONIKER | RENTAL PERIOD |
|---|---|---|---|---|---|---|
| TITLE 1 | 3460 | 501 | TITLE1.MOD | 901 | TRAILER1.MOD | 24 |
| TITLE 2 | 2970 | 502 | TITLE2.MOD | 902 | TRAILER2.MOD | 48 |
| TITLE 3 | 5490 | 503 | TITLE3.MOD | 903 | TRAILER3.MOD | 48 |

INTERACTIVE ENTERTAINMENT NETWORK SYSTEM AND METHOD FOR CUSTOMIZING OPERATION THEREOF ACCORDING TO VIEWER PREFERENCES

RELATED APPLICATIONS

This is a continuation of U.S. patent application Ser. No. 09/179,545 filed Oct. 26,1998, which is now U.S. Pat. No. 6,571,390, which is itself a continuation of U.S. patent application Ser. No. 08/437,096 filed May 5, 1995, which is now U.S. Pat. No. 5,861,906.

TECHNICAL FIELD

This invention relates to interactive entertainment network systems, such as interactive television (ITV) systems, and to methods for operating such interactive entertainment network systems.

BACKGROUND OF THE INVENTION

Movie audiences are familiar with browsing for video movies in video rental stores. These stores offer hundreds to thousands of videos that are conveniently arranged in racks throughout a physical building space. Typically, the videos are grouped according to different categories. For instance, videos are grouped by kind, such as new releases, oldies, westerns, foreign films, family films, video games, and so forth. Other groupings might be by actor/actress name, alphabetical order of title, or topic. The movie groups assist shoppers in locating a video section of the store that interests them. The shopper can then limit his/her search for a suitable video to that section.

Newer, interactive television (ITV) systems are now bringing the video store to peoples'homes. ITV systems have a single computerized control center, known as the "headend", which interactively communicates with multiple distributed television units located in subscriber homes. The headend provides traditional forms of programming, such as the familiar cable and broadcast programs, as well as newer forms of programming, such as video-on-demand. In the video-on-demand (VOD) mode of operation, a viewer can order video movies directly from his/her own television set. Indeed, in a full interactive entertainment network system like this invention, it is contemplated that a viewer will be able to order "on demand" movies, video games, television shows, and other video content programs from their home.

It would be advantageous for an ITV system to provide movies in a convenient organized fashion like that afforded by a video store. Unfortunately, unlike a video store which has an abundance of physical floor space to present many different movies, the ITV system only has limited space available on a TV screen to present the options. Due to the space constraints, the ITV system is limited to displaying short lists of movies for possible rental. Browsing through hundreds or thousands of movie titles using short lists is fairly cumbersome for a viewer. This inconvenience is multiplied if the viewer is forced to revisit the selection process of the entire, overwhelmingly large database of movies each time he/she wants to rent a video.

Accordingly, one object of this invention is to provide an ITV system with a convenient way to manage lists of movies according to the preferences of each viewer.

Another issue that often arises when renting video movies is the dilemma of selecting one or two movies from among all of the available choices. After browsing for a good length of time, a shopper commonly weeds out a vast majority of the video options to arrive at several movies of interest. From this filtered selection, the shopper selects one or two movies for rental, a process which can be particularly tough if two or more people are shopping together. The non-selected videos are returned to the shelf with the shopper resolving to remember the other selections for "next time". On the next trip to the video store, however, the shopper has inevitably forgotten the previous selections and thus repeats the entire filter-and-select process, again consuming a tremendous amount of browsing time.

In the ITV environment, where short lists and menus are presented, a viewer might experience difficulty in browsing through lists and then returning to one list to rent a particular movie. This task is different than the video store arena where the shopper simply returns to the physical racks which hold the movies of interest. Many individuals are not accustomed to manipulating selections using computer user interfaces, and might find them less intuitive than physically walking to the same section of the video store each time to rent movies of interest. The additional problem of "remembering" other movies of interest in the ITV setting is equally daunting because the viewer must not only remember the movies themselves, but must also remember how to intelligently traverse through the various screen menus to find these movies.

Accordingly, another object of this invention is to provide an ITV system that allows a viewer to easily identify movies of interest.

SUMMARY OF THE INVENTION

This invention provides an interactive entertainment network system with a video-on-demand (VOD) application that allows the viewer to create a customized list of preferred video content programs, such as movies, games, TV shows, and so forth. Viewers are permitted to select criteria for grouping various video content programs into manageable sets. Once grouped, previews for the set of programs can be displayed. The VOD application permits the viewer to browse the previews at their own rate, skipping forward to the next preview or backward to the previous preview. During this automated browsing, the VOD application permits the viewer to add any programs of interest to a customized list. The viewer can retrieve the customized list at any time, which is much more convenient than trying to remember programs of interest or where they are located in the lists.

The interactive entertainment network system of this invention has a headend connected to multiple user interface units in individual homes via a distribution network, such as cable, RF, and/or satellite network. The headend provides full length video content programs to the user interface units, which are commonly referred to as "set-top boxes" in the ITV arena. The headend also supplies previews, which are known as "trailers" in the film industry, about the programs.

The headend has a storage medium in the form of a continuous media server database and a program information database. The continuous media server database stores the actual video data streams of both the full length video content programs and their associated preview video trailers. The video data streams are stored digitally as individual data files. Unique monikers are assigned to each program and trailer to locate them within the continuous media server database. The headend also has a program information database which maintains program data records pertaining to the video content programs. The program data records contain information about the programs, such as a program ID, title, moniker, cast members, director, rating, length of movie, brief description, and so on.

The program information database also contains a list of viewers and their uniquely assigned viewer IDs. The program information database correlates the program IDs of the video content programs with the viewer IDs to maintain customized lists of programs for each viewer according to his/her individual preferences. In one implementation, the correlation is accomplished using a join table which interrelates the program and viewer IDs.

Each user interface unit has a processor and a video-on-demand (VOD) application which executes on that processor. The VOD application enables a user to order one or more video content programs from the headend. The VOD application is initiated when the viewer switches to a designated VOD channel. Upon entering the VOD application, the STB transmits a message containing the viewer ID to the headend via the distribution network. The headend, responsive to the message, queries the program information database to retrieve all of the program IDs that are correlated with that viewer ID. These program IDs identify program data records of the programs which are part of the viewer's customized list. The headend transmits the program data records back to the requesting STB.

A user interface operable on the STB displays the customized list in a scrollable format. The viewer is permitted to scroll up or down, whereby one entry on the list is removed as another is added. The scroll rate is adjustable, thereby permitting the viewer to select a comfortable reading pace.

The viewer can order a video by selecting an entry on the customized list. The program moniker of the selected program is sent to the headend. The program moniker is used by the continuous media server database to retrieve the selected video content program.

The program information database contains a rental period associated with the ordered video content program. The rental period is typically longer in duration than the runtime length of the associated video content program. The headend transmits the ordered video content program as many times as the viewer requests during the rental period, but refuses to transmit the ordered content program upon expiration of the rental period.

BRIEF DESCRIPTION OF THE DRAWINGS

FIG. 7 is a simplified example of database records and a join table used to correlate program and associated trailer IDs.

FIG. 8 is a simplified example of a data packet of program information that is sent from the headend to the STB.

DETAILED DESCRIPTION OF THE PREFERRED EMBODIMENT

Figure 1:
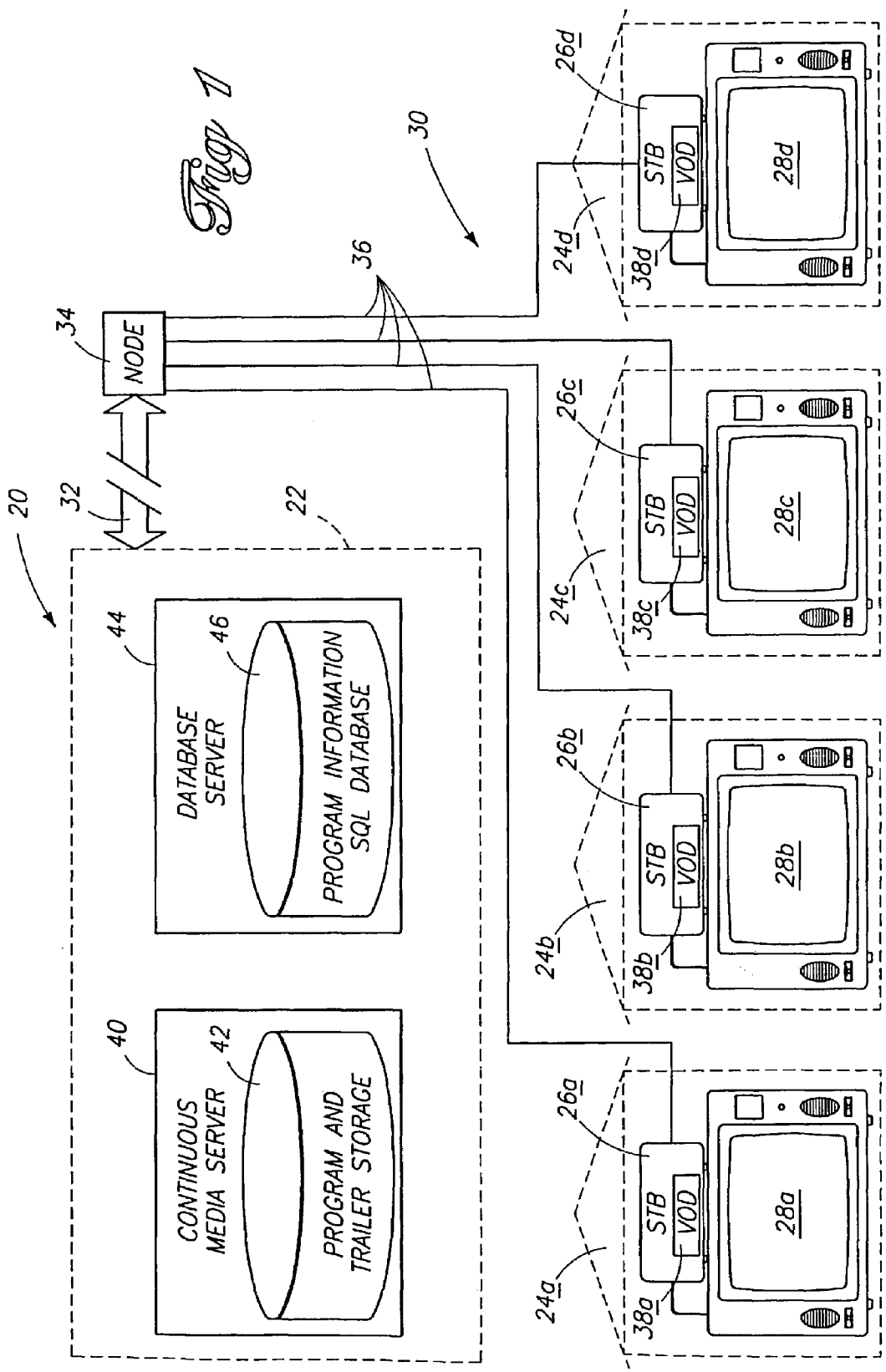
FIG. 1 is a block diagram of a interactive entertainment network system according to this invention.

FIG. 1 shows an interactive entertainment network system 20 in the form of an interactive television (ITV) system. System 20 includes a centralized headend or headend server 22 which is configured to provide video content programs to multiple subscriber homes. Representative homes 24a-24d are shown. The video content programs provided by headend 22 might include traditional broadcast TV shows, cable programs, on-demand movies, video games, and other services such as those commonly provided in the past by on-line computer services. A single headend might service 250,000 or more homes.

Each home has a user interface unit 26a-26d, commonly referred to as a set top box (STB), coupled to a television set (TV) or video display device 28a-28d. The user interface units receive digital video signals from headend 22 and control which programs are displayed on the associated TVs. Instead of separate STBs, a user interface unit can be incorporated in the TV itself in other implementations.

Headend 22 is interconnected to the subscribers' homes 24a-24d via a multi-tier network or distribution structure 30. In the illustrated embodiment, distribution structure 30 includes a high-speed, high-bandwidth fiber optic cable network 32 coupled to regional distribution nodes (represented by distribution node 34). The speed and bandwidth of the fiber optic cable affords the desired performance for supporting a fully interactive system. Each distribution node 34 is connected to multiple user interface units 26a-26d via conventional home entry lines 36, such as twisted-pair lines or coaxial cable. As an example, each distribution node 34 supports approximately 1200 homes. As technology continues to improve, it is believed that parts of the distribution structure can be replaced with wireless forms of communication, such as RF communication or satellite communication.

Each user interface unit 26a-26d is configured to run a video-on-demand (VOD) application 38a-38d. VOD is like having a video store in your own home. Viewers are permitted to browse a wide selection of movies, video games, and TV shows, and rent the program they want to see immediately from their own TV sets. The VOD application is activated when a viewer switches to a designated VOD channel on the STB.

Headend 22 provides both video content programs and associated preview video trailers to the user interface unit within each home. The programs and trailers are transmitted as digital video data streams from headend 22 over distribution structure 30 to homes 24a-24d. Headend 22 includes a continuous media server 40 which has a program and trailer storage 42 to store the digital video data streams as independent files. Each data file represents a full length video content program—such as a feature-length movie, video game, or past TV show—or a preview of that movie, game, or show. Present designs of program and trailer storage 42 are expected to hold hundreds to thousands of full length programs and their trailers.

A potential viewer can select any one of these video data streams for viewing at any time. Unique monikers are assigned to each data file (i.e., each full length program and each trailer). The monikers are used to locate the corresponding data file within the continuous media server database at the headend. The continuous media server is preferably implemented as a disk array data storage system consisting of many large capacity storage disks, each on the order of one to several Gigabytes. The video data streams are stored digitally on the storage disks in predetermined or mapped locations. The locations of the video data streams are kept in a memory map and each video data stream can be accessed through pointers to the particular memory location.

The continuous media server can service simultaneous requests to view a program on demand (even the same program) from thousands of homes. The digitally stored video data streams can be accessed by any number of viewers at the same or staggered times. For example, one household might request a video data stream of a movie at 8:00 pm, and a second household might request the same video data stream of that movie at 8:02 pm. This situation is easily accommodated by slightly staggered pointers to the same video data stream beginning at the same memory location within program and trailer storage 40.

Headend 22 also has a database server 44 to store the programming information about each program and trailer. Database server 44 contains a structured query language (SQL) database 46 with program data records containing information relating to available movies, games, TV shows, or other programs. The SQL records reflect such things as the program title, cast members, director, rating, whether the program has closed captioning or stereo audio, length of program, scheduled time of the program, network name, program category, description text, and so forth. The program information is used by the VOD and other applications running on the STB (such as the electronic programming guide) to assist the viewer when previewing different programs.

The program data records stored in SQL database 46 also contain unique program IDs that are assigned to each full length video content program and unique trailer IDs that are assigned to each video trailer. The program and trailer IDs are used as a shorthand identification tag which can be used for rapid search of SQL database 46 and for establishing relational ties between a program and its associated trailer. This aspect is described in more detail below with respect to FIG. 7. The program data records further contain the monikers to locate the programs and trailers within the continuous media server storage 42. These monikers are short name descriptors that represent or call to indexing pointers to storage locations within storage 42 of continuous media server 40. The pointers identify storage locations of the video data streams of the programs and trailers that correspond to the information listed in the SQL database.

SQL database 46 also contains a list of viewers and their associated viewer IDs. The list of viewer IDs is used by the headend to identify and provide addressing information for individual household STBs (or even individual viewers within the household). The viewer ID list is also used to coordinate a customized list of preferred video programs, as is described in more detail below.

Figure 2:
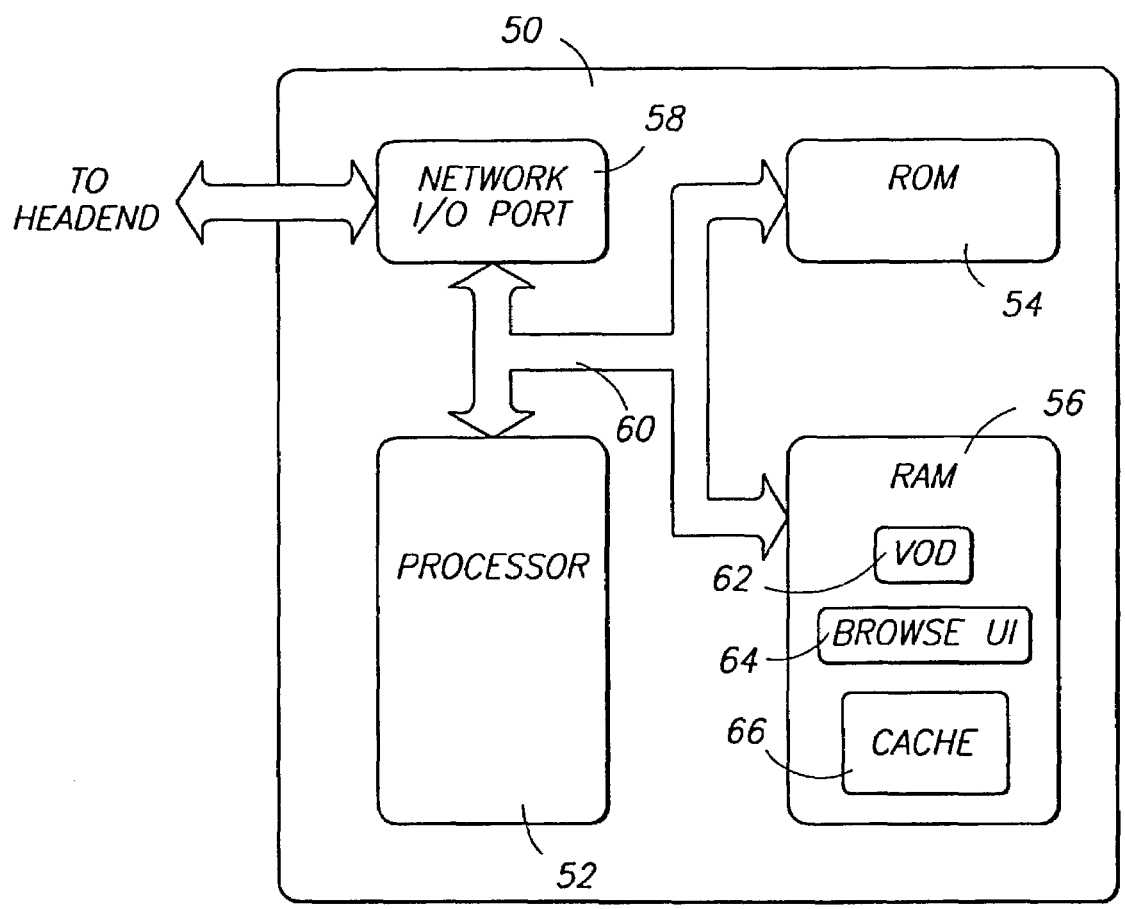
FIG. 2 is a block diagram of a user interface unit according to this invention.

FIG. 2 shows a user interface unit or set-top box 50 according to one is implementation of the invention. STB 50 includes a programmable data processor 52, non-volatile memory (ROM) 54, volatile data/program memory (RAM) 56, and network I/O port 58. These components are interconnected via an internal multi-bit conductor or bus 60. Network I/O port 58 is responsive to data processor 52 for communicating with the headend to request and receive the program data records from SQL database 46. The network I/O port also receives the digital video data streams of the full length programs and short trailers from continuous media server 40. Network I/O port 58 is preferably a bi-directional transceiver incorporating analog-to-digital and digital-to-analog conversion circuitry.

A video-on-demand (VOD) application 62 runs on STB data processor 52 from data/program memory 56. VOD 62 is an executable program which is downloaded as an object or module from the headend in response to instructions by a viewer. As part of the VOD application, a preview browse user interface (UI) 64 is also configured to execute on data processor 52 from RAM 56. Preview browse UI 64 assists the viewer in navigating through portions of the video-on-demand application. The preview browse UI helps the viewer define a set of criteria used to group programs of interest, and then facilitates the display of preview video trailers on the TV which correspond to these programs. The UI further enables the viewer to "surf" through the various trailers at his/her own pace, and rent a program for immediate viewing.

VOD 62 also maintains a cache or memory 66 in the STB which temporarily stores the program data records received from the headend. Memory 66 is used to store the program IDs and monikers as well as the trailer IDs and monikers.

A viewer enters the VOD application by switching to the designated VOD channel on the set-top box, either by random channel surfing or by directly switching to that channel. When the STB tunes to the VOD channel, a continuous loop of "new releases" trailers are immediately displayed. These trailers are a predefined group of about 20-40 of the newest video programs that are presently available for rent. The trailers are displayed in a sequential fashion, one after another, to entice a viewer to stay on the VOD channel, watch more previews, and ultimately order a program.

Figure 3:
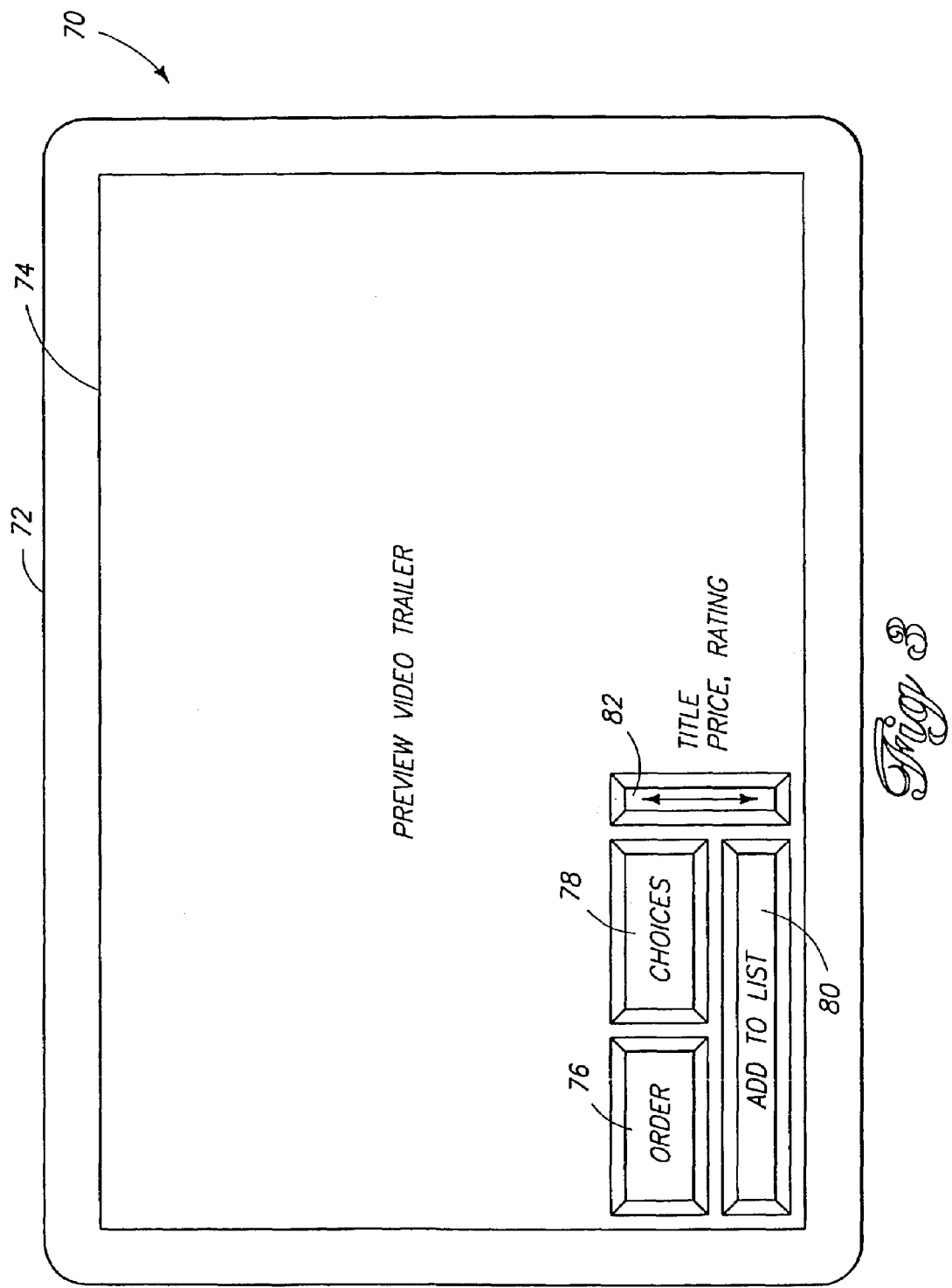
FIG. 3 is an exemplary screen illustration of a video-on-demand application, and particularly, of an initial screen in a preview browse user interface.

FIG. 3 shows an initial screen display 70 of the preview browse UI. In this graphic illustration, outer rectangle 72 represents the television screen. An inner rectangular area 74 represents the standardized NTSC video safe zone, which is the area of a TV screen that is presumed to be viewable on any set. The "new releases" trailers are played within outer area 72 in full-screen video, thereby ensuring that the filmmaker's art in crafting the preview will be given its maximum possible visual impact.

The preview browse UI has multiple actuatable graphical icons overlaid on the video trailers. In initial screen display 70, four icon buttons are present at the lower-left corner: an "order" button 76, a "choices" button 78, an "add to list" button 80, and an integrated "up/down" button 82. The buttons are 75 percent transparent and placed directly over the video trailer. The graphical icon buttons are arranged within video safe area 74.

The "order" button 76 enables the user to order a video content program that corresponds to the displayed preview video trailer. It initiates a financial transaction of renting the movie, video game, or TV show from the ITV service provider. The "choices" button 78 enables the viewer to choose different criteria for grouping programs into manageable sets for a more selective review. For instance, the criteria might be by star name, category type (e.g. new releases, westerns, oldies, foreign films), or kind (i.e., video games, movies, TV shows).

The "add to list" button 80 permits the viewer to create a customized list of personal favorites that he/she might wish to watch some day. As the viewer browses the trailers, the viewer can simply click the "add to list" button 80 and the program ID of the video content program associated with the presently displayed trailer is added to the customized viewer list. The list is kept at the headend in the program information database. This feature is described in more detail below.

The "up/down" button 82 enables the viewer to skip through the preview video trailers, forwards and backwards, in the same manner that the viewer is accustomed to channel surfing through traditional cable channels. This allows the viewer to control the pace at which he/she wishes to watch the previews, skipping over uninteresting ones or replaying previews of interest.

A focus frame, or the like, can be used to highlight the operable button. To enhance intuitive visual feedback to the viewer, the program browse UI provides a graphical change to indicate when an icon button is depressed. This provides visual and auditory feedback which the user associates with the manual actuation and tactile sensation of depressing a physical control button on the STB or remote control handset. This feedback is helpful in the interactive environment because the viewer might experience a slight delay, albeit very short, between the time he/she depresses the physical control button and the time the appropriate response to the control is depicted on the TV. By graphically changing the icon, the viewer is visually informed that his/her command has been received and is in the process of being completed.

A space adjacent to the icon buttons is reserved for displaying textual information pertaining to the program preview that is being shown. This information includes the title, rental price, and rating, although any other program related information can also be displayed (e.g., cast names, close caption, brief description, director, etc.). This information is included in the program data records.

Upon entering the VOD application, the new releases trailers are displayed. If the viewer does nothing, the previews of the new releases cycle through, over and over. The viewer can immediately order a program from this initial screen 70 using "order" button 76; add the program to their customized list using the "add to list" button 80; skip through the previews using "up/down" button 82; or pop up other search criteria using "choices" button 78 to select a new criteria for grouping programs.

Figure 4:
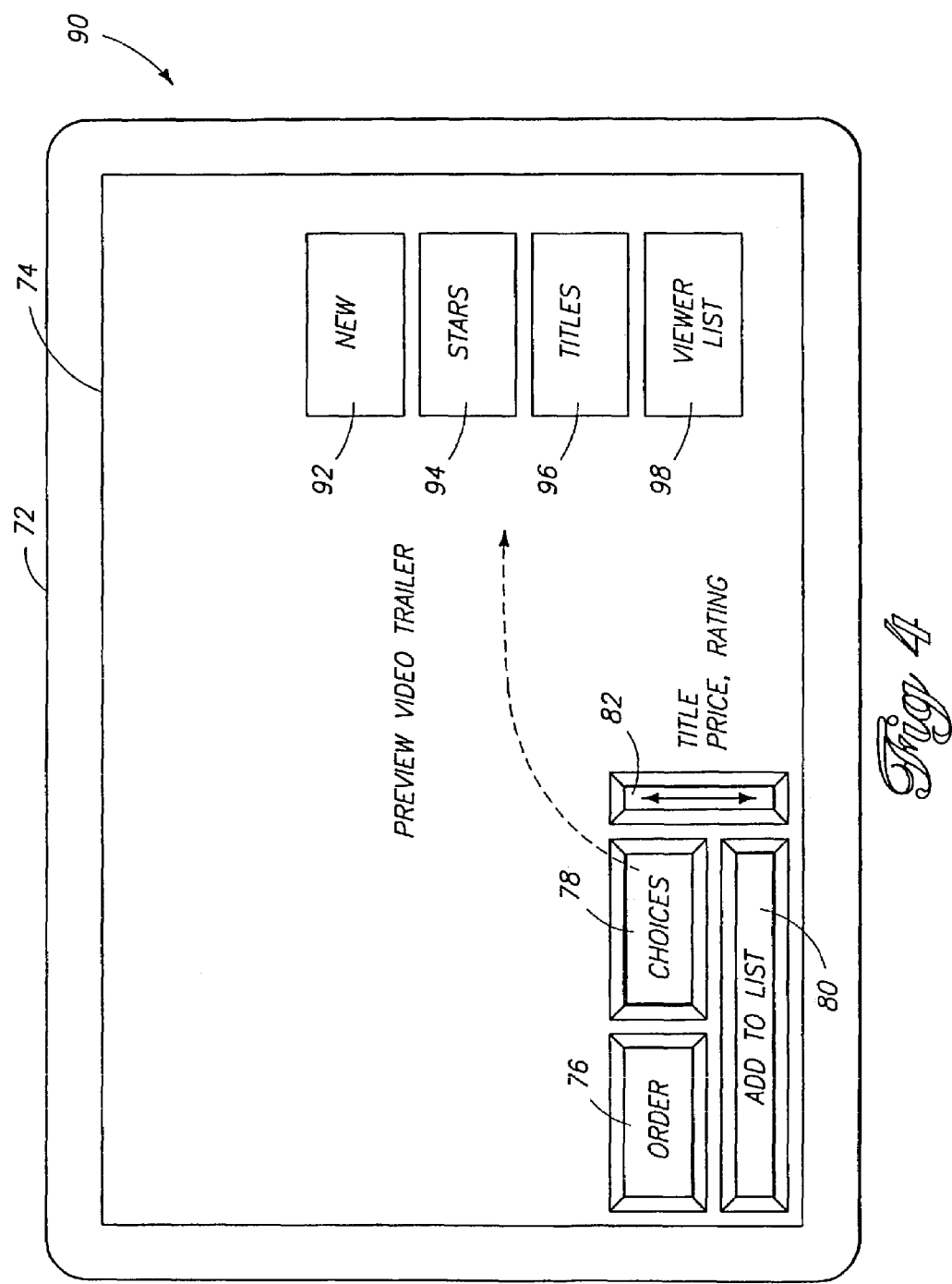
FIG. 4 is another exemplary screen illustration of the preview browse user interface, appearing subsequent to the FIG. 3 screen.

FIG. 4 shows a screen display 90 that is depicted when a viewer selects the "choices" button 78 to pull up possible search criteria for different sets of programs. For discussion purposes, an example four criteria selection icon buttons pop up (as represented by the dashed arrow, which is not actually shown on the screen): a "new" button 92 which activates a list of programs that are newly released, a "stars" button 94 which activates a list of stars, a "titles" button 96 which pulls up a list of program titles, and a "viewer list" button 98 which presents the personal customized list of programs. These four icon buttons are overlaid on the displayed video trailers.

Figure 5:
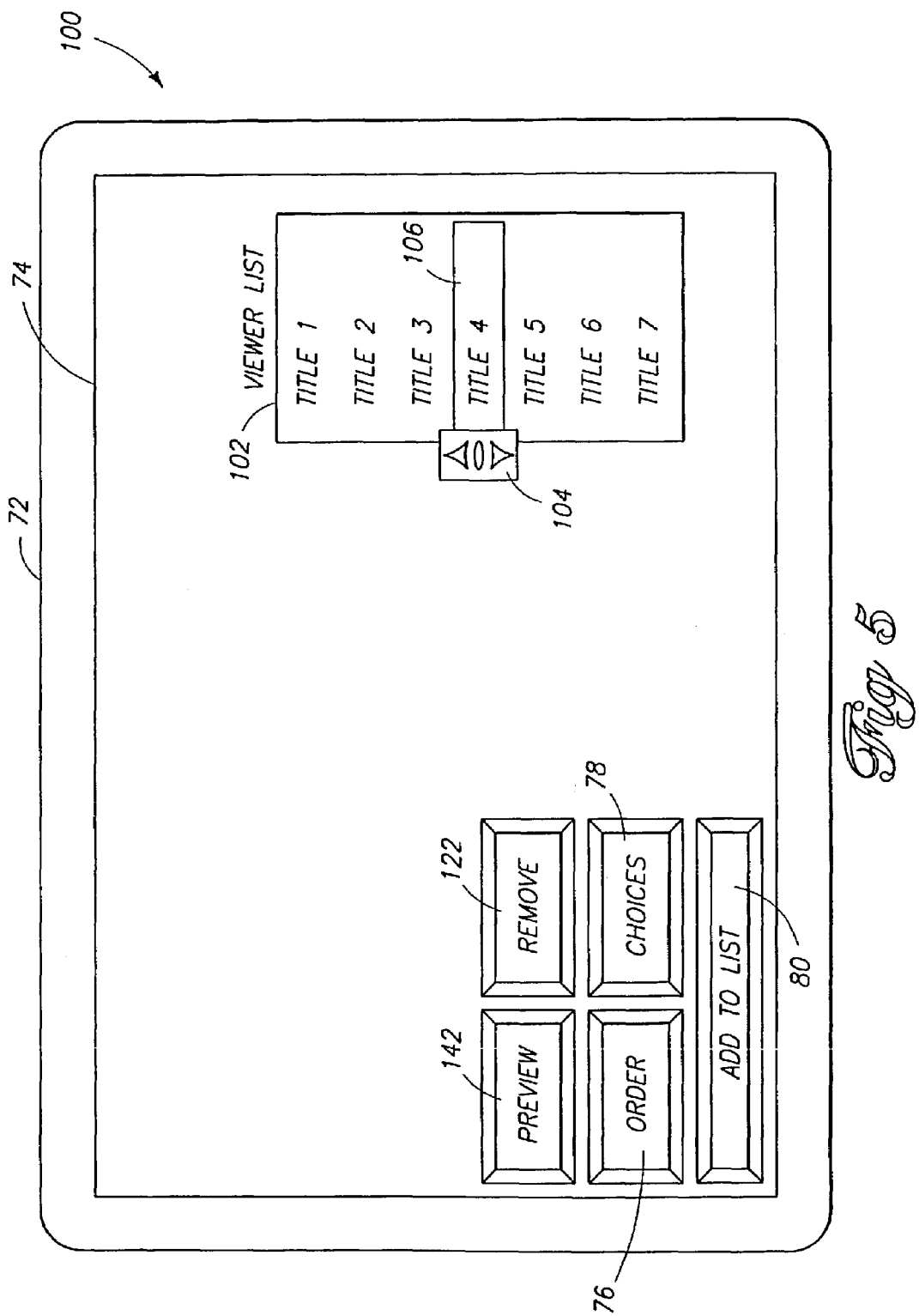
FIG. 5 is yet another exemplary screen illustration of the preview browse user interface, which can appear subsequent to the FIG. 4 screen.

FIG. 5 shows a screen display 100 following selection of one of the criteria selection buttons 92-98 from screen display 90 (FIG. 4). In this example screen display, the viewer has selected the "viewer list" button 98 to bring up a customized list of movies 102 which the viewer has assembled. In response to this actuation, the STB processor sends a message which contains the viewer ID to the headend. In response, the headend retrieves from the program information database a customized list of preferred video content programs that are correlated with the viewer ID. The customized list is downloaded to the STB memory. The titles of the programs from all or a portion of the customized list is presented as a scrollable list 102. A graphical up/down arrow 104 indicates that the list can be bi-directionally scrolled upwards or downwards.

In this implementation, the list scrolls while a focus bracket 106 remains stationary. When the viewer manipulates up/down arrow 104 in the up direction, the program titles shift downward within box 102 so that one displayed entry (e.g., "title 7") is removed as a new entry is added (i.e., an entry is added above the "title 1" entry). This yields an appearance of visually scrolling the focus bracket 106 upward over the next upper name (i.e., "title 3"). Conversely, when the viewer manipulates the up/down arrow 104 in the down direction, the list scrolls upward to present a visual appearance of moving the focus bracket 106 down the list.

The customized list of titles (or any other list) is scrolled at a selected rate which can be adjusted by the viewer to meet their personal reading preference. The user interface unit offers an on-screen menu (not shown) which permits the user to adjust the scroll rate. The user interface unit keeps the selected scroll rate in the programmable STB memory and uses it to scroll any on-screen list at the preferred speed.

Figure 6:
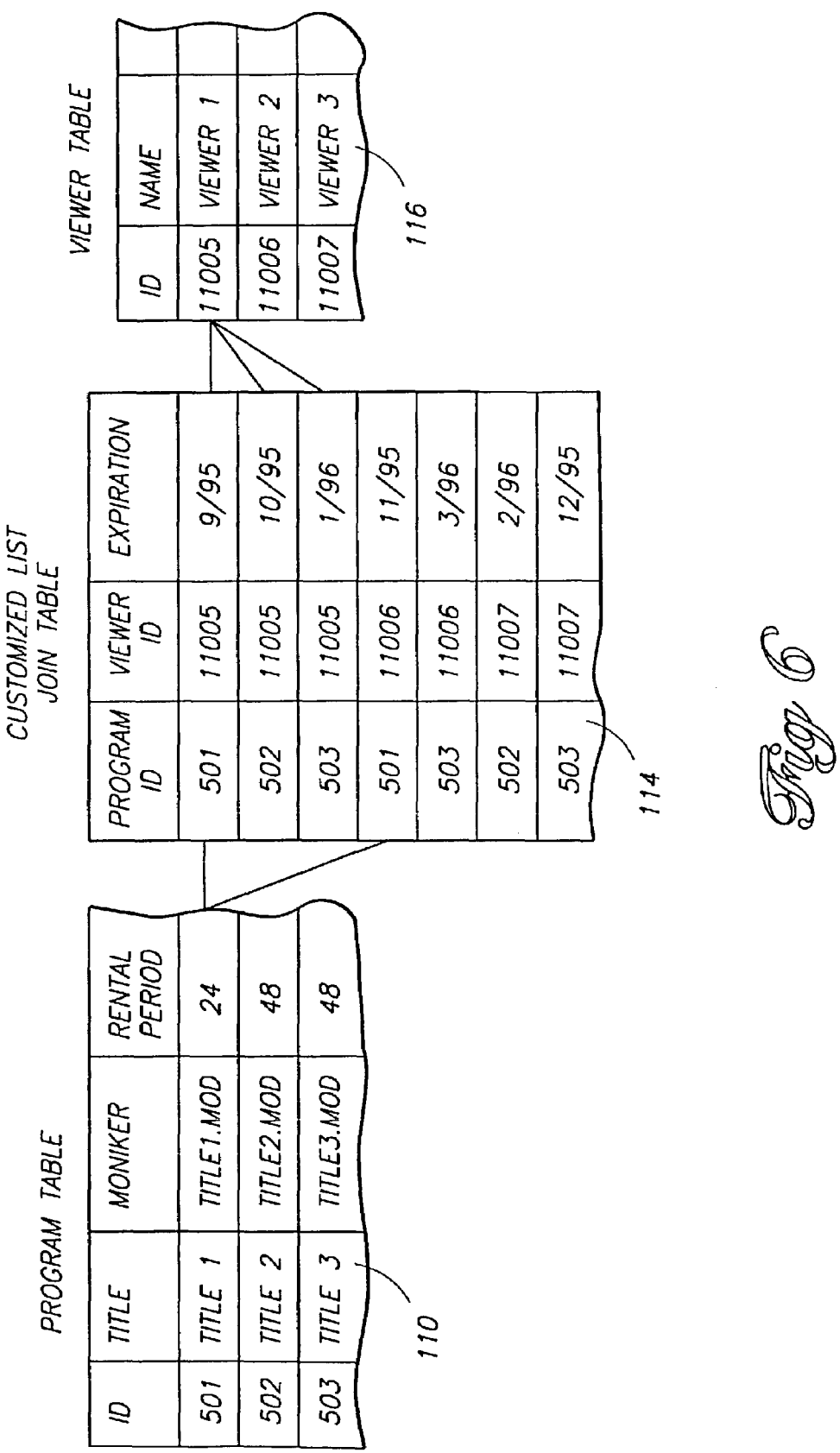
FIG. 6 is a simplified example of database records and a join table used to correlate viewer and program IDs.

FIG. 6 shows an implementation for correlating the viewer IDs with the program IDs of the video content programs at the headend to help respond to a query for the viewer's own customized list. The SQL database at the headend maintains a program table 110 which stores the records pertaining to the programs. Table 110 contains a program ID, title, moniker, as well as other information. Program table 110 further includes a rental period associated with each program. The rental period feature is described below in more detail.

The SQL database also maintains a viewer table 112 which contains a list of viewers and their associated unique IDs. A join table 114 correlates the program IDs from program table 110 and the viewer IDs from viewer table 112. A join table offers a many-to-many relationship between items listed in different tables. For example, the same program may be found on many different customized lists. Each item is stored in one place within the database, and redundancy is limited to the join tables. In the illustrated example, viewer 1 has a list of three programs, having "title 1", "title 2", and "title 3". Thus, the viewer's ID 11005 is tied to the program IDs 501, 502, and 503 in join table 114.

Join table 114 also has a field for an expiration date associated with the listed program. The expiration date marks when the video content program will be automatically removed from the customized list in the event the viewer has not rented the program by that date. The expiration date is typically set a number of months in the future so that programs will not be prematurely removed from the list. The inclusion of an expiration date, however, helps maintain the customized lists so that they do not grow uncontrollably over a period of time.

When the headend receives the viewer ID from the user interface unit, join table 114 is easily and quickly searched to find all program IDs that correlate to the viewer ID and which have not expired. The database returns information of the video content programs that are correlated with the viewer ID. The full program records of the tagged program IDs are then retrieved from the SQL database. The headend also retrieves the monikers and IDs of the trailers associated with the identified programs from the SQL database. The programs are correlated with corresponding trailers within the database to simplify the task of cross-referencing the programs and trailers.

FIG. 7 shows one implementation for correlating the fill length video content programs with their associated preview video trailers. The SQL database maintains a trailer table 116 which contains a list of information pertaining to trailers, including the ID, name, and moniker. A join table 118 correlates the IDs of the full length programs with the IDs of their associated preview clips. Accordingly, the SQL database can be queried using the program ID to return the related trailer ID of the associated preview clip. Once the trailer ID is determined, other information about the trailer, such as its moniker, can be quickly accessed.

To continue the above example, the headend queries program/viewer join table 114 (FIG. 6) using the viewer ID to retrieve a customized set of programs that the viewer has assembled. The headend also retrieves information pertaining to the trailers for those programs, using the program IDs to index the program/trailer join table 118 (FIG. 7). The headend transmits the programming information back to the user interface unit over the distribution network.

FIG. 8 shows an example data packet 120 transmitted from the headend to the STB. Data packet 120 contains program titles, runtime length of the programs, program IDs, program monikers, trailer IDs, trailer monikers, and rental periods. This packet is received and deciphered by the STB processor and the information contained therein is stored in the RAM. The programming information is used by the STB to form viewer list 102 (FIG. 5). As described above, the customized viewer list 102 can be scrolled upwards and downwards at a selectable rate to see all of the titles contained in the list. Up/down arrow icon 104 and focus bracket 106 are provided to aid in this process.

With reference again to FIG. 5, notice that screen display 100 includes a "remove" icon button 122 which can be actuated to delete the highlighted program title from the list. Upon actuation of "remove" button 122, the user interface unit signals the headend to remove the association in join table 114 between the viewer ID and the program ID of the removed program.

Alternatively, the viewer can add programs to the list by actuating the "add to list" icon button 80, whereby the user interface unit informs the headend to associate the program ID of the added program with the viewer ID in join table 114. This feature enables the viewer to interactively assemble his/her own list 102 of preferred programs, adding titles to it and removing titles from it. Personalizing the program listings lends a sense that the viewer is in control of the technology, and should not be intimidated by it. The "add to list" icon button 80 is available on all of the screen displays for the user's convenience and to further enhance the degree of interactivity of the system.

Figure 9:
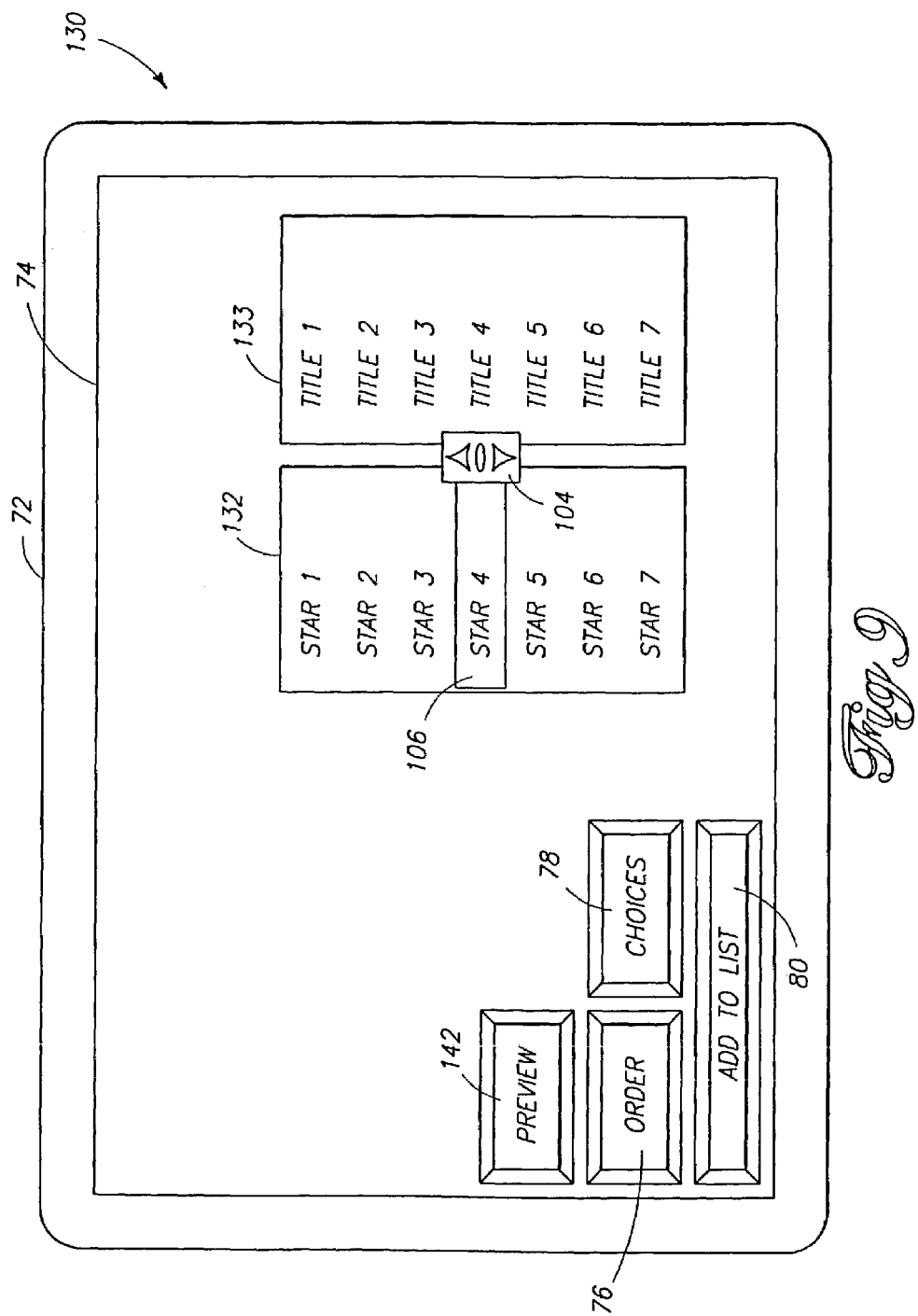
FIG. 9 is another exemplary screen illustration of the preview browse user interface, which can appear subsequent to the FIG. 4 screen.

The above example employs a viewer name as a selection criteria for grouping programs together. However, other criteria can be used to group different sets of programs for the viewer. For example, FIG. 9 shows a screen display 130 which is depicted following selection of the "stars" button 94 in screen display 90 (FIG. 4) to bring up a list of stars 132. In response to this actuation, the STB processor sends a message to the headend to retrieve a list of stars from the program information database. The list of stars is downloaded to the STB memory. It is noted that this list, as well as others, might already have been downloaded to the STB as part of initialization procedures when activating the video-on-demand application.

Upon selection of a particular star name (e.g., "star 4"), the user interface user sends the star ID to the headend to use as a query for searching the program information SQL database. The database returns a list of movies in which the selected star has performed. That is, these movies satisfy the criteria specified by the viewer, which in this case, is the name of star 4. The list of programs is presented in a scrollable list 133. Here, seven program titles are displayed in scrollable list 133, all of which have star 4 appearing in them. To further assist the viewer, a label such as "Star 4 Movies" can be displayed on the screen to give the viewer some notion of the selected movie grouping. As the viewer chooses new criteria, causing different groupings of programs to be downloaded from the headend, the description label is updated to help identify the context of the current grouping of programs.

Figure 10:
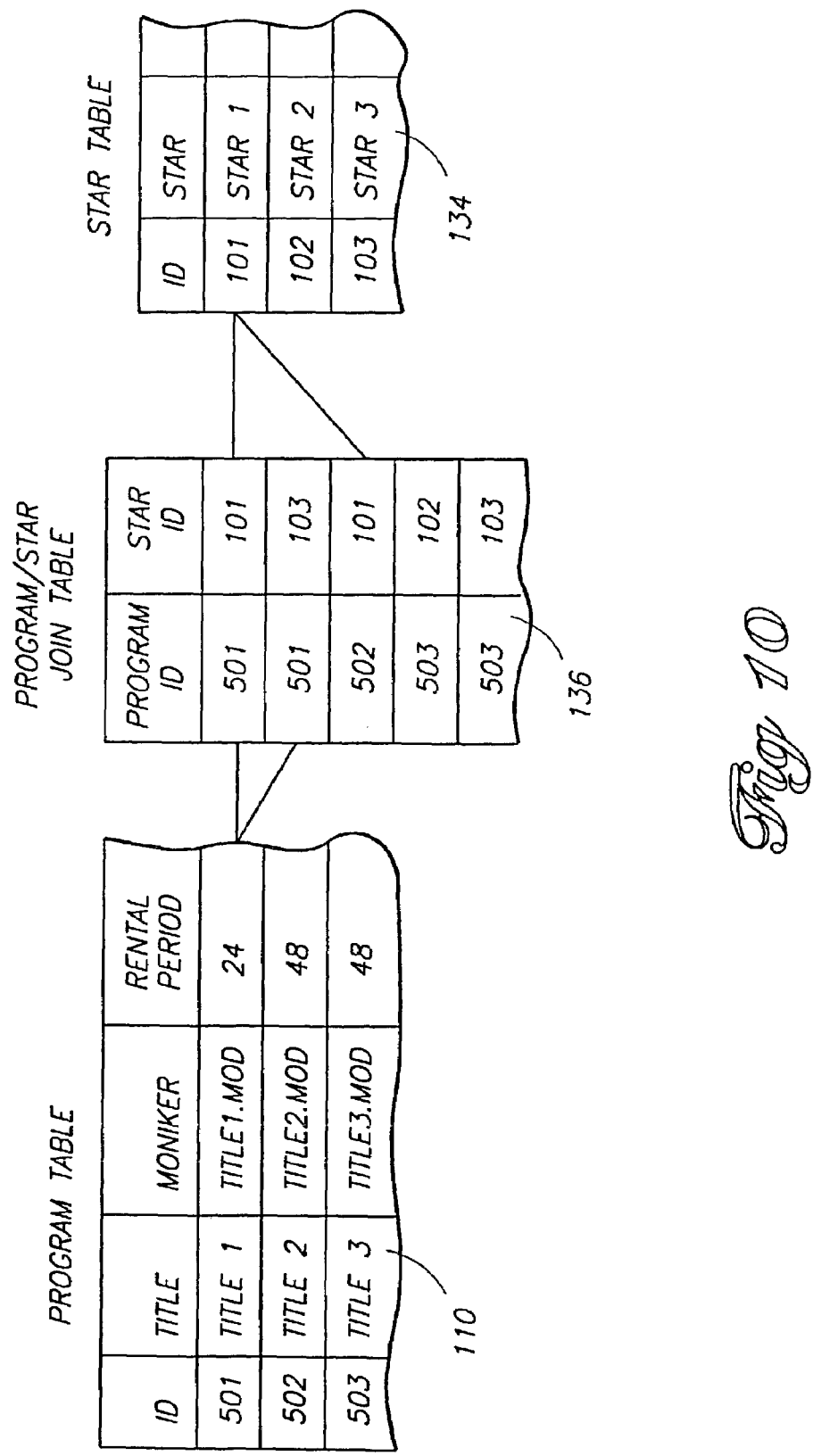
FIG. 10 is a simplified example of database records and a join table used to correlate program and star IDs.

FIG. 10 shows one implementation of the headend program information database for correlating the stars with the programs. A star table 134 is maintained in the SQL database at the headend. It contains star IDs, star names, and other information pertaining to the star. A join table 136 relates the program IDs from program table 110 with the star IDs from star table 134. When the headend receives a star ID from the user interface unit, the join table is easily and quickly searched to find all program IDs that correlate to the star ID.

With reference to FIGS. 5 and 9, the preview browse UI has a "preview" icon button 142 which can be actuated to preview the group of programs contained in the displayed list. In the FIG. 5 screen display, for example, a series of video trailers for the programs listed in viewer's customized list 102 are displayed upon actuation of "preview" button 142. In the FIG. 9 screen display, actuating "preview" button 142 initiates a series of video trailers for those programs listed in title list 133. The new series of trailers replaces the default "new releases" trailers.

Upon election of the "preview" button, the user interface unit sends the moniker of one of the preview trailers to the headend along with a request to begin transmitting the corresponding video stream. Alternatively, the user interface unit might send a begin transmission signal, with the headend already knowing which set of clips to transmit. The headend transmits the video previews in sequential order according to the order shown on the displayed list. Preferably, the monikers and IDs of the trailers and associated programs are queued in the STB memory in a queue order that corresponds to the sequential order in which the associated preview trailers are transmitted.

The preview browse UI returns to screen display 70 of FIG. 3 to permit full-screen viewing of the preview clips on the list as the are played on the television set. In addition to calling up the highlighted program from a list, another benefit of the "preview" button is that it readies the other trailers in the program grouping. For instance, from the stars list, a viewer might select a particular movie in which star 4 appeared, and receive the preview of that movie. However, without returning to the list, the previews to related movies with star 4 are made available for review. This is very convenient for the viewer.

If left alone, the trailers for the selected list (e.g., the viewer's customized list) will run in a continuous loop, one after another. The viewer can leisurely watch the short set of trailers for the listed programs without interrupting them. Alternatively, the viewer can optionally skip over previews of uninteresting programs or repeat previews of attractive programs.

In the illustrated implementation, "up/down" control button 82 (FIG. 3) operates as "next/previous" buttons which enable the viewer to skip from a presently displayed trailer to a next or previous trailer. When activated, the user interface unit sends the next or previous moniker in the queue order back to the headend. The moniker is used to access the continuous media server storage to retrieve the next or previous trailer. The headend then ceases sending the present trailer and begins transmitting the retrieved next/previous trailer so that the transition appears almost instantaneous to the viewer. This interactive feature allows the viewer to surf through the video clips at their own pace.

The "next/previous" operation directly corresponds to the "up/down" operation of traversing a list. Flipping backward through previous trailers is essentially the same as moving up through the list, even though the list is not actually displayed. Similarly, skipping forward to next trailers is like moving down through the list. When the viewer reaches the end of a set of previews, the previews return back to the beginning of the list in a continuous loop.

The preview browse UI allows the viewer to order the full length program directly from the preview browse UI, without reverting to a blank order menu or the like. Suppose the viewer wishes to rent the program that is presently being previewed. The viewer simply actuates the overlaid "order" button 76 in any one of the screens of the preview browse UI. This causes the STB to send a message with the program moniker that corresponds to the trailer being depicted. The program moniker is used by the continuous media server database to retrieve the full length video content program. The headend then transmits the full length video content program over the distribution network to the STB that ordered the program.

In other implementations, the STB might transmit the program ID to the headend. The program ID can be related to the appropriate program moniker via program table 110 in SQL database. Yet another alternative is to have the STB send the trailer ID to the headend. The trailer ID can be cross-referenced to the program ID via join table 118, which is then related to the appropriate program moniker via program table 110.

The headend will transmit the rented video content program any time the viewer requests it, so long as the rental period associated with that movie has not lapsed. The rental period is longer in duration than the runtime length of the associated video program. For instance, the rental for program "title 2" has a 48 hour rental period, as indicated by the associated rental period in the program table 110 (FIGS. 6 and 10). The viewer might wish to watch the program many times within the 48 hour period, or watch portions of it at different times. This aspect is akin to renting a physical VCR cassette from a video store. The viewer can watch the video it at his/her own schedule, so long as they return the video within the prescribed time. Here, the headend will transmit the program as much as the viewer desires during the rental period. Upon expiration of that period, however, the headend will refuse to transmit the program unless the viewer once again orders it.

The rental period affords a tremendous benefit of flexibility. Unlike conventional cable systems where a viewer is restricted to renting a movie that is played at certain preset start times, the interactive entertainment network system of this invention enables the viewer to watch a rented program at their leisure. Furthermore, with the full interactive network of this invention, it is contemplated that the viewer would be able to rewind, fast forward, pause, stop, or play the video data stream at their pace, just like the viewer operates a traditional VCR machine. These traditional shuttle controls are possible in the ITV environment by sending shuttle control messages to the headend which then alters how the video stream is transmitted to the user interface unit.

In the illustrated embodiment, a single rental period is assigned to each program. The rental period is another field in program table 110. In another implementation, a single rental period can be assigned to all of the programs as a whole. For instance, all video programs can be rented for a period of 48 hours. As still another alternative, different rental periods can be assigned to groups of similar programs. For example, "new release" movies could be assigned a rental period of 24 hours, "westerns" or "oldies" movies could be assigned a rental period of 48 hours, rerun TV shows could be assigned a rental period of 36 hours, and video games could be assigned a rental period of 72 hours.

The rental period can also be programmed and adjusted at the headend. This provides flexibility to the ITV system operator to set the rental period as they wish. One operator may require a 24 hour rental period while another operator might wish to offer a special 48 hour rental period.

Figure 11:
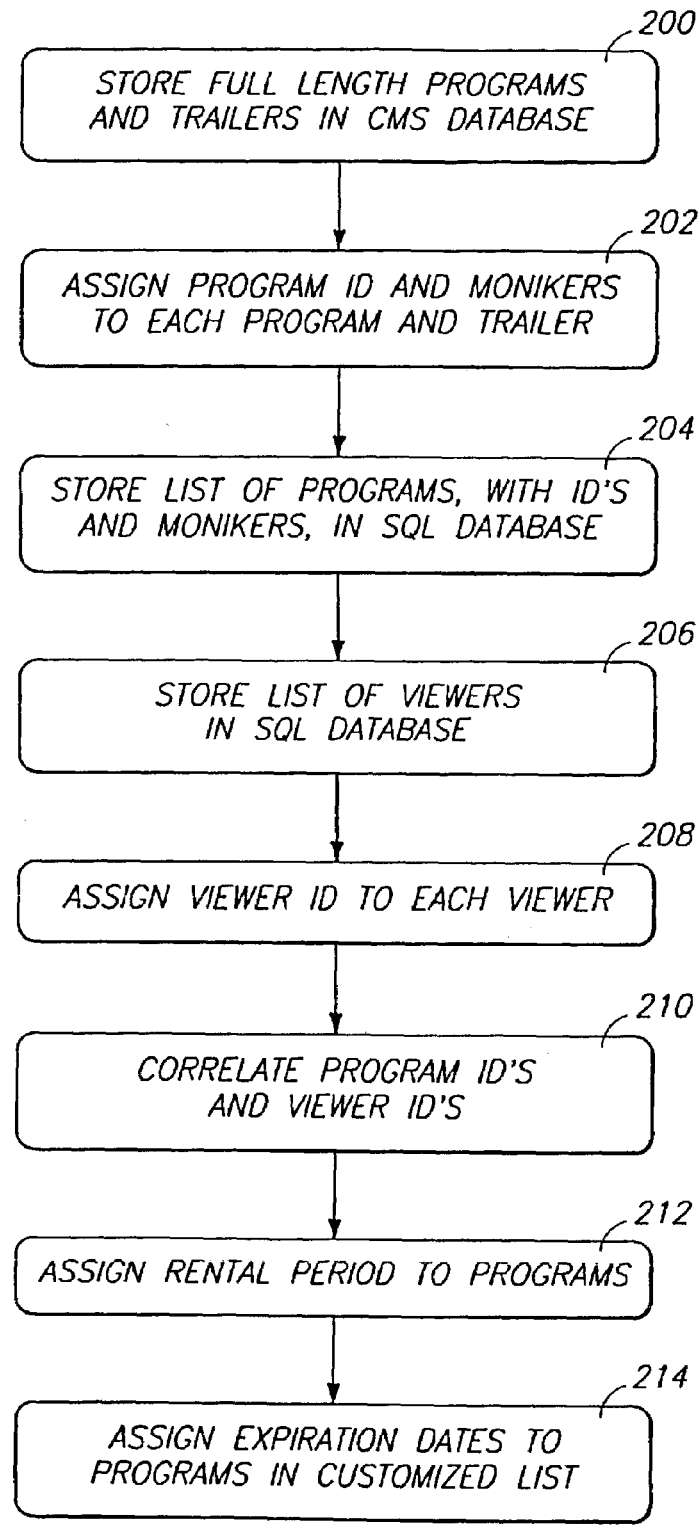
FIG. 11 is a flow diagram of steps for initializing an interactive entertainment network system for preferred operation.
Figure 12:
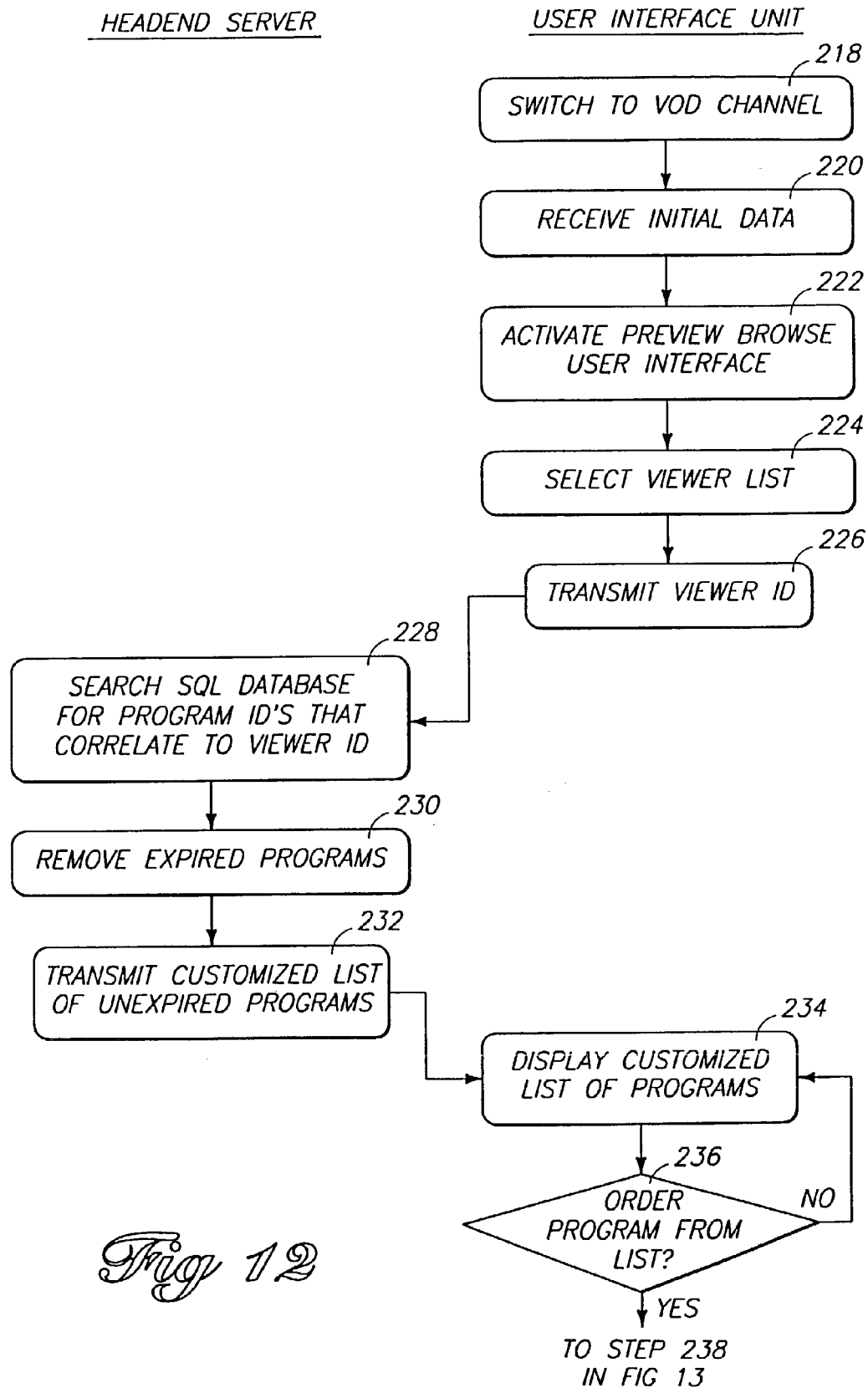
FIGS. 12-13 present a flow diagram of steps for customizing operation of an interactive entertainment network system according to this invention.
Figure 13:
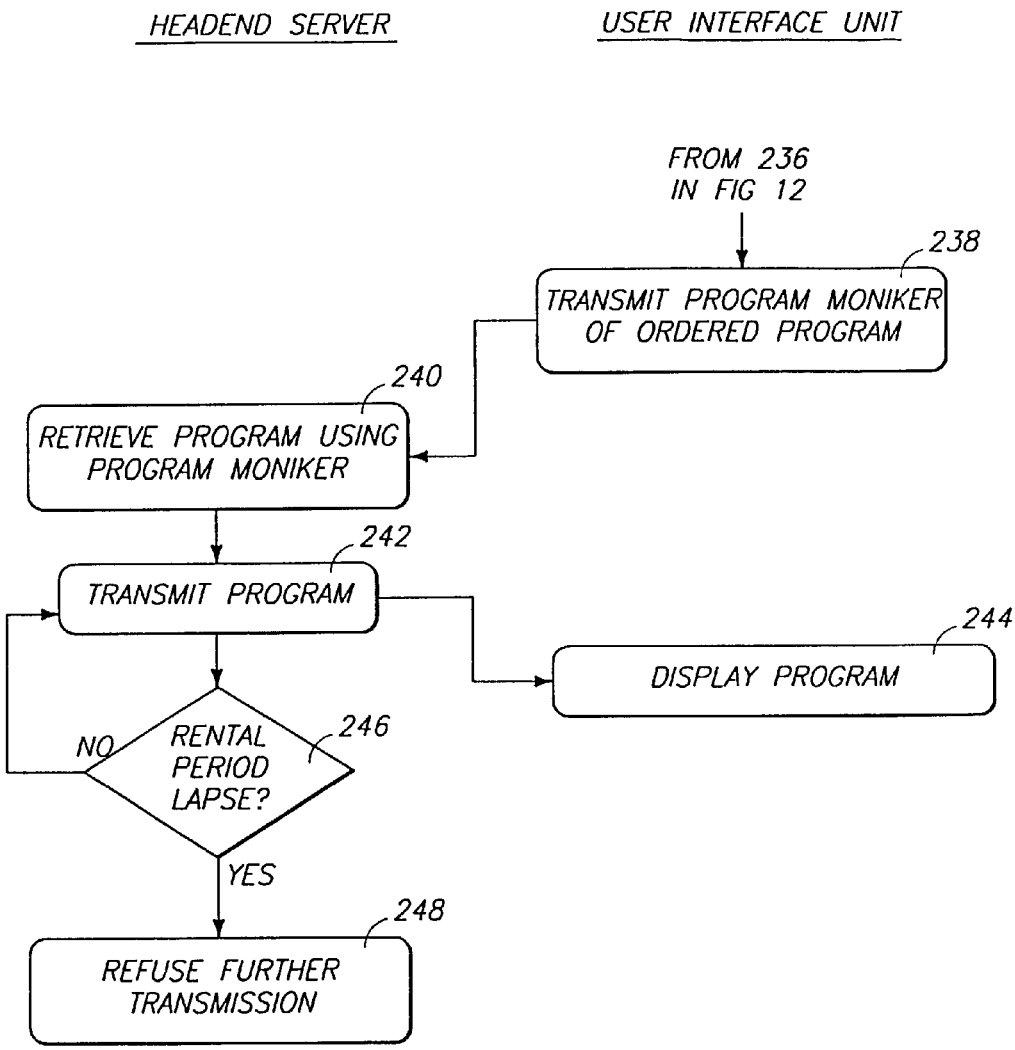

FIGS. 11-13 show a method for operating an interactive entertainment network system of this invention. FIG. 11 shows the initialization steps for implementing an interactive system. At step 200, the full length video content programs and preview video trailers are stored in the continuous media server (CMS) database as independent digital data files. A unique moniker and ID is assigned to each full length program and to each trailer (step 202). A list of programs, with their accompanying IDs and monikers, are stored in the SQL database (step 204) at the headend. A list of viewers is also maintained in the SQL database (step 206). Each viewer has an assigned ID (step 208) which is provided in the SQL database as part of the viewer's records. In fact, the SQL database maintains all of the programming information pertaining to the programs, such as cast members, director, runtime length, rating, and so on.

At step 210, the program IDs and viewer IDs are correlated. In the example implementation, join table 114 (FIG. 6) is used to correlate the program and viewer IDs. Other program parameters can also be correlated with one another to promote an efficient operation, such as correlating the program IDs and trailer IDs in join table 118 (FIG. 7) and the program and star IDs in join table 136 (FIG. 10).

At step 212, an appropriate rental period is assigned to the programs. As noted above, the rental period is adjustable. Additionally, an individual rental period can be assigned to each program, or to categories of like programs, or to all of the programs. This rental period is maintained as part of the program data a records, as shown in program table 110. At step 214, an expiration date is assigned to each program in the viewer's customized list.

FIGS. 12-13 show a method for customizing operation of the interactive entertainment network system in the VOD mode according to preferences of individual users. To promote clarity, the flow diagram illustrates exemplary steps as though they are performed at either the headend server or user interface unit. Beginning with step 218 in FIG. 12, the viewer activates the VOD application by switching the STB to the designated VOD channel. Initial data is received by the STB from the headend (step 220). Such data might include category lists, star lists, new releases lists, or other information that is useful in the startup phase. At step 222, the VOD application initiates the preview browse user interface and the initial screen display 70 (FIG. 3) is depicted.

The default set of "new releases" trailers are shown. If the viewer remains passive, the "new releases" trailers will run in a continuous loop, one after another. If the viewer wishes to select a new group of programs, the viewer can actuate the "choices" button 78 to pull up various criteria (e.g., star name, title, viewer list, etc.). From this screen 90 (FIG. 4), the viewer can select their own customized list by actuating the "viewer list" icon button 98 (step 224). The viewer ID is transmitted from the STB to the headend (step 226).

At the headend, a search of the SQL database is conducted to locate program records which correlate to the viewer's ID (step 228). In the example implementation described above, the SQL database uses the viewer ID to reference all associated programs that exist in the customized list join table 114 (FIG. 6). At step 230, the headend removes any programs that have not been ordered before their expiration date. These programs can be added again at a later time, but this housekeeping feature helps manage the customized viewer list. At step 232, the set of program records on the customized list are sent back to the requesting STB in the form of data packet 120 (FIG. 8). This packet includes the program monikers and IDs, the trailer monikers and IDs, and the rental period.

Back at the STB, the previews of the requested set of programs are displayed on the TV set (step 234). The first trailer in the group is displayed automatically as part of calling up the viewer list, or in response to the viewer's actuation of the "preview" icon button 142 (FIG. 5). As described above, the viewer can watch the trailers as they are presented, or skip through them at the viewer's own pace.

At step 236, it is determined whether the viewer would like to order a program. If not (i.e., the "no" branch from step 236), the trailers continue to cycle. Once the viewer settles on a particular program and orders it (i.e., the "yes" branch from step 240), the STB transmits the program moniker to the headend (step 238 in FIG. 13). The CMS database is accessed using the moniker to retrieve the full length video content program (step 240), which is then transmitted back to the STB (step 242). The rented program is then displayed on the TV set (step 244). The viewer's account for renting the program is charged the appropriate amount.

The headend transmits the program in its entirety. The headend will also re-transmit the program so long as the rental period has not lapsed. This procedure is illustrated as the "no" branch loop from decision step 246. Once the rental period expires (i.e., the "yes" branch from step 246), the headend refuses to transmit the program until it is rented again by the viewer (step 248).

The means for performing the steps of this method are described above with reference to FIGS. 1-10.

The interactive entertainment network system of this invention provides short, organized sets of programs that are manageable and convenient for review. The system filters the entire database of programs into small groups of similar programs based on intuitive criteria. This is advantageous over a system that always presents the same overwhelming list of all available programs on the database to the user each time he/she enters the VOD mode.

Another benefit of this invention is the freedom afforded the viewer to surf through the group of previews at his/her own pace. This enhances the interactivity of the system, and encourages participation from the viewer. Still another benefit is the ability to order the full length program directly from the preview, as opposed to a stark order menu. This attribute is user friendly and creates an intuitive interface for the viewer.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

The invention claimed is:

1. A method comprising:
maintaining on a server, video content that may be served to a client device, wherein the server is located a substantial distance remotely from the client device;
receiving at the server, a request from the client device to rent the video content for a specified rental time period;
storing at the server, an indicator of the rental time period;
receiving at the server, one or more requests from the client device to download the video content; and
in response to each request to download the video content:
the server determining whether or not the rental time period has expired;
in an event that the rental time period has not expired, the server transmitting the video content to the client device; and
in an event that the rental time period has expired, the server refusing to transmit the video content from the server to the client device based solely on expiration of the rental time period.

2. The method as recited in claim 1, wherein the rental time period is longer in duration than a runtime length associated with the video content.

3. A system comprising:
a data repository associated with a server, the data repository configured to store an indicator of a rental time period associated with a video content; and
a video content server associated with the server, the video content server configured to:
receive from a remotely located client device, a request to rent the video content for the rental time period associated with the video content;
receive from the remotely located client device, one or more requests to download the video content; and
in response to each request to download the video content:
determine whether or not the rental time period has expired;
in an event that the rental time period has not expired, transmitting the video content to the client device, such that the video content is transmitted to the client device one or more times during the rental time period; and
in an event that the rental time period has expired, refusing to transmit the video content to the client device such that the video content is not transmitted to the client device after the rental time period has expired, wherein the determination to not transmit the video content to the client device after the rental time period has expired is based solely on expiration of the rental time period.

4. The system as recited in claim 3 further comprising:
a client device configured to:
- request the video content for rental for the rental time period;
- request one or more downloads of the video content during the rental time period, resulting in the video content being received; and
- request one or more downloads of the video content after expiration of the rental time period, resulting in the video content not being received.

5. The system as recited in claim 3, wherein the rental time period is longer in duration than a runtime length associated with the video content.

6. The system as recited in claim 3, wherein the rental time period is at least twice as long in duration as a runtime length associated with the video content.

7. One or more computer-readable media comprising computer-readable instructions which, when executed, cause a computer system to:
- store at a server, an indicator of a rental time period associated with a video content rental initiated by a client device, wherein the client device is remotely located from the server;
- receive at the server, from the client device, one or more requests to download the video content; and
- in response to each of the one or more requests:
  - determine whether the rental time period has expired;
  - in an event that the rental time period has not expired, transmit the video content from the server to the client device; and
  - in an event that the rental time period has expired, refuse to transmit the video content from the server to the client device, based solely on expiration of the rental time period.

8. One or more computer-readable media as recited in claim 7, wherein the rental time period is longer in duration than a runtime length associated with the video content.

9. One or more computer-readable media as recited in claim 7, wherein the rental time period is at least twice as long in duration as a runtime length associated with the video content.

* * * * *